United States Patent [19]

Barker et al.

[11] Patent Number: 4,949,590
[45] Date of Patent: Aug. 21, 1990

[54] HYDRAULIC CYLINDER ASSEMBLY

[75] Inventors: David C. Barker, Utica; Keith V. Leigh-Monstevens, Troy, both of Mich.

[73] Assignee: Automotive Products plc, Warwickshire, England

[21] Appl. No.: 268,207

[22] Filed: Nov. 7, 1988

Related U.S. Application Data

[62] Division of Ser. No. 156,820, Feb. 17, 1988, Pat. No. 4,924,673.

[51] Int. Cl.[5] .............................................. G05G 1/14
[52] U.S. Cl. ...................................... 74/512; 74/560; 74/513
[58] Field of Search .................. 74/512, 513, 514, 516, 74/518, 519, 522, 560, 561, 562, 562.5, 564, 566; 192/99 S, 110 R

[56] References Cited

U.S. PATENT DOCUMENTS

| | | | |
|---|---|---|---|
| 1,985,588 | 12/1934 | Tatter | 60/589 |
| 3,156,097 | 11/1964 | Brown | 92/69 |
| 3,181,299 | 5/1965 | Page | 60/589 |
| 3,333,902 | 8/1967 | Liverance et al. | 74/512 X |
| 3,427,807 | 2/1969 | Moyes | 60/589 |
| 3,430,512 | 3/1969 | Wossner | 74/512 |
| 3,479,068 | 11/1969 | Brittain | 60/585 X |
| 3,643,524 | 2/1972 | Herring | 74/512 |
| 3,643,525 | 2/1972 | Gibas | 74/512 |
| 3,765,264 | 10/1973 | Bruhn | 74/512 |
| 3,795,111 | 3/1974 | Haraikawa | 60/589 X |
| 3,861,236 | 1/1975 | Ramage | 74/512 |
| 3,861,237 | 1/1975 | Mounts | 74/516 |
| 3,875,820 | 4/1975 | Morden | 74/516 X |
| 4,130,027 | 12/1978 | Leighton | 74/512 |
| 4,270,406 | 6/1981 | Lipshield et al. | 74/516 |
| 4,295,336 | 10/1981 | Falk | 60/589 X |
| 4,300,409 | 11/1981 | Leighton | 74/512 |
| 4,391,159 | 7/1983 | Sellmeyer | 74/516 |
| 4,429,589 | 2/1984 | Stocker | 74/513 |
| 4,463,562 | 8/1984 | Taft | 60/589 X |
| 4,528,895 | 7/1985 | Nakamura | 60/589 X |
| 4,590,765 | 5/1986 | Leigh-Monstevens | 60/585 |
| 4,624,152 | 11/1986 | Stotz et al. | 192/99 S X |
| 4,624,291 | 11/1986 | Compton et al. | 60/584 X |
| 4,679,680 | 7/1987 | Komatz | 60/589 X |
| 4,708,028 | 11/1987 | Pardy | 74/512 |
| 4,741,161 | 5/1988 | Belart et al. | 60/589 X |
| 4,819,500 | 4/1989 | Musumiya et al. | 74/513 |

FOREIGN PATENT DOCUMENTS

| | | | |
|---|---|---|---|
| 2156108 | 5/1973 | Fed. Rep. of Germany | 74/512 |
| 2571868 | 4/1986 | France | 74/512 |
| 47347 | 4/1981 | Japan | 60/589 |
| 0071631 | 6/1981 | Japan | 74/512 |
| 71655 | 6/1981 | Japan | 60/589 |
| 311469 | 10/1971 | U.S.S.R. | 60/589 |
| 1120068 | 7/1968 | United Kingdom | 60/585 |
| 2052691 | 1/1981 | United Kingdom | 74/512 |

*Primary Examiner*—Vinh T. Luong
*Attorney, Agent, or Firm*—Krass and Young

[57] ABSTRACT

A control assembly for a motor vehicle including a bracket; a hydraulic cylinder assembly including a cylinder mounted on the bracket and a piston rod projecting out of the cylinder; and a pedal assembly including a pedal arm mounted for pivotal movement on the bracket about a pivot axis and pivotally connected to the free end of the piston rod at a location spaced from the pivot axis. A sleeve is mounted on the bracket and is journaled on a pivot shaft secured to a fixed structure of the vehicle so that the entire assembly, including the bracket, hydraulic cylinder, and pedal assembly, may be pivotally adjusted within the passenger compartment of the motor vehicle. A slot in the bracket spaced from the pivot axis coacts with a fastener carried by the vehicle fixed structure to secure the assembly in any position of pivotal adjustment within the passenger compartment.

10 Claims, 7 Drawing Sheets

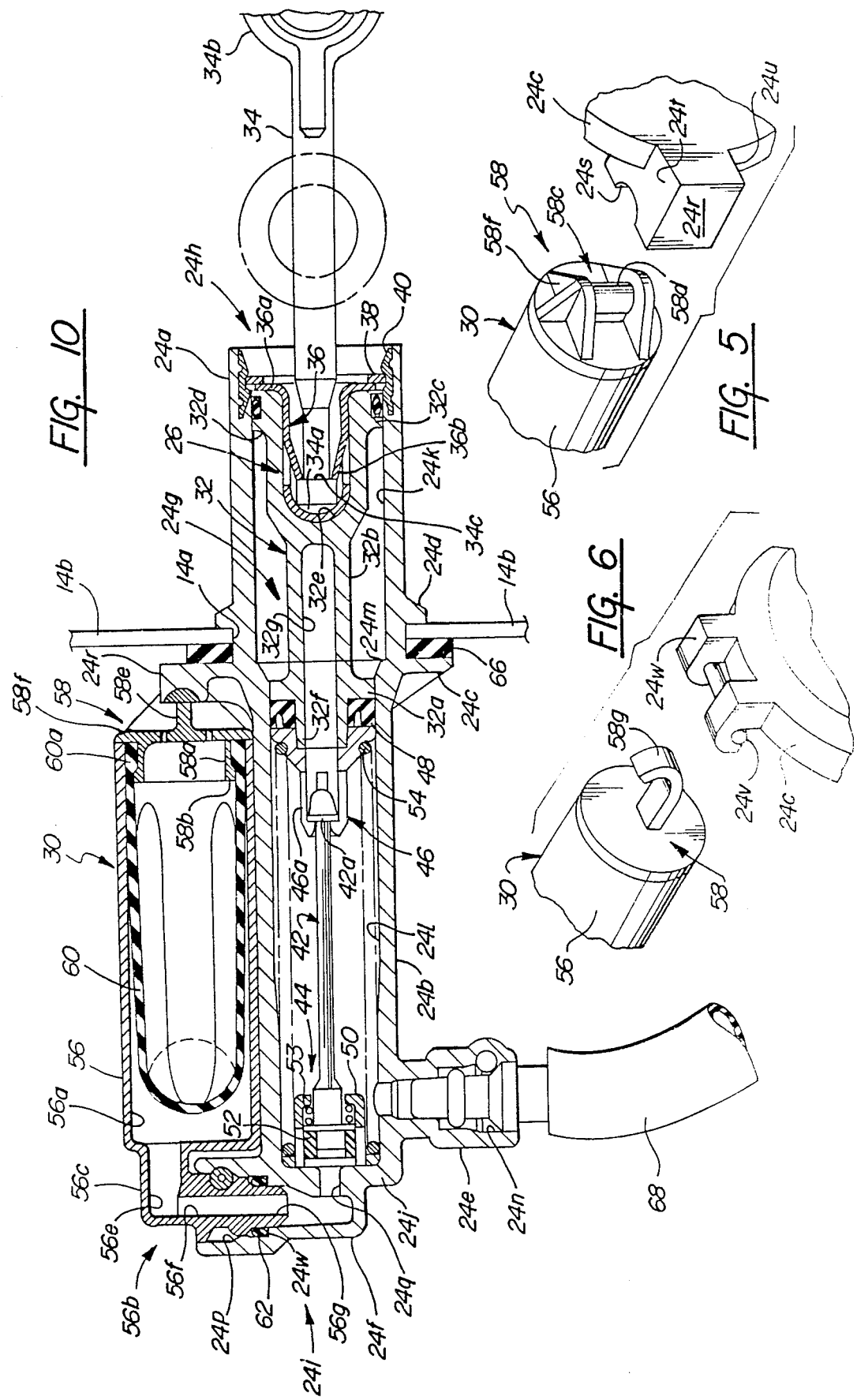

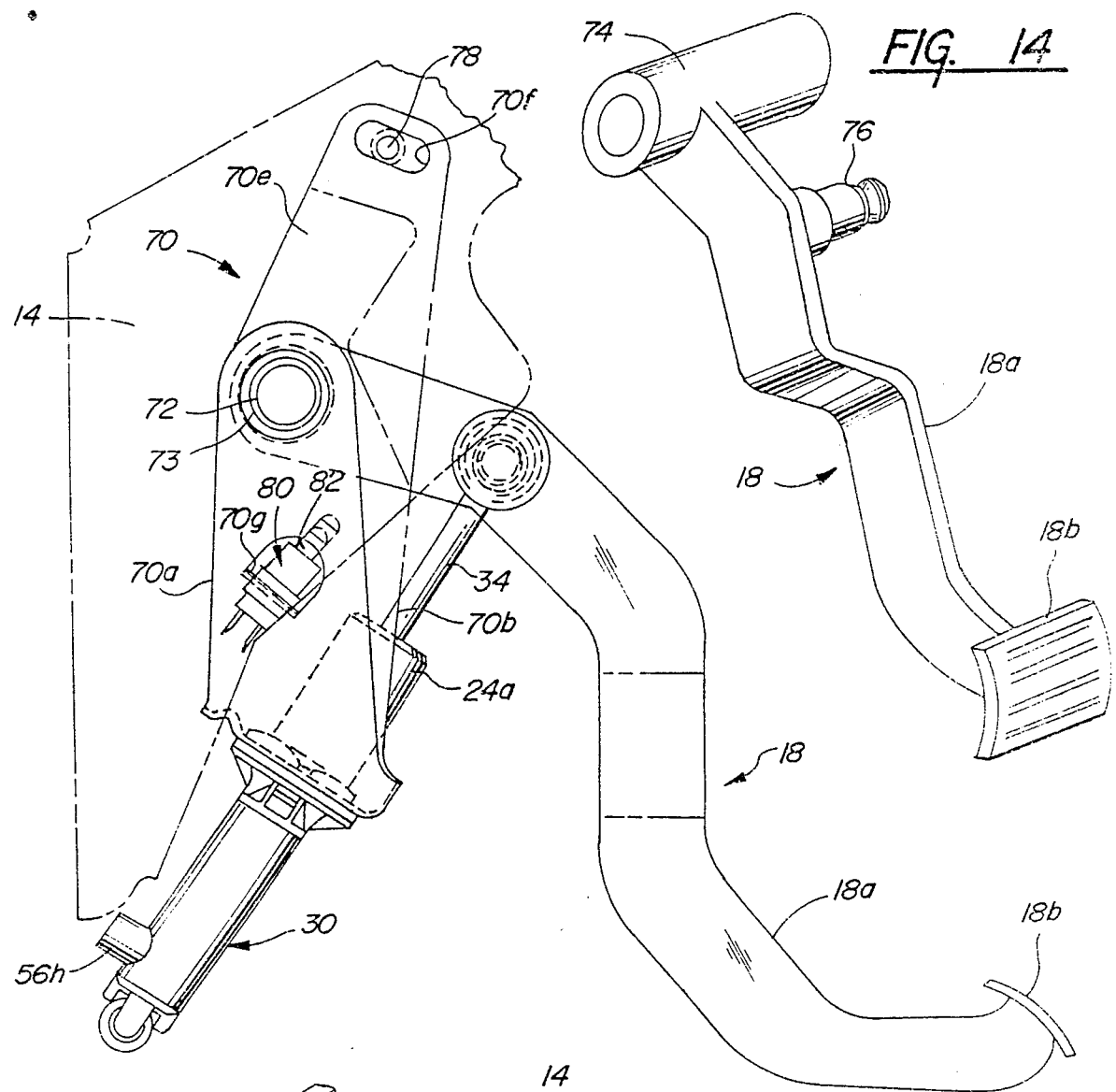
FIG. 14
FIG. 11
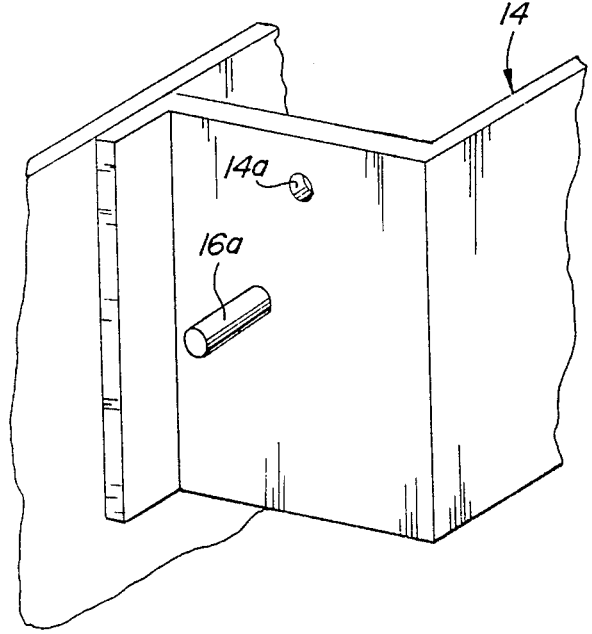
FIG. 13

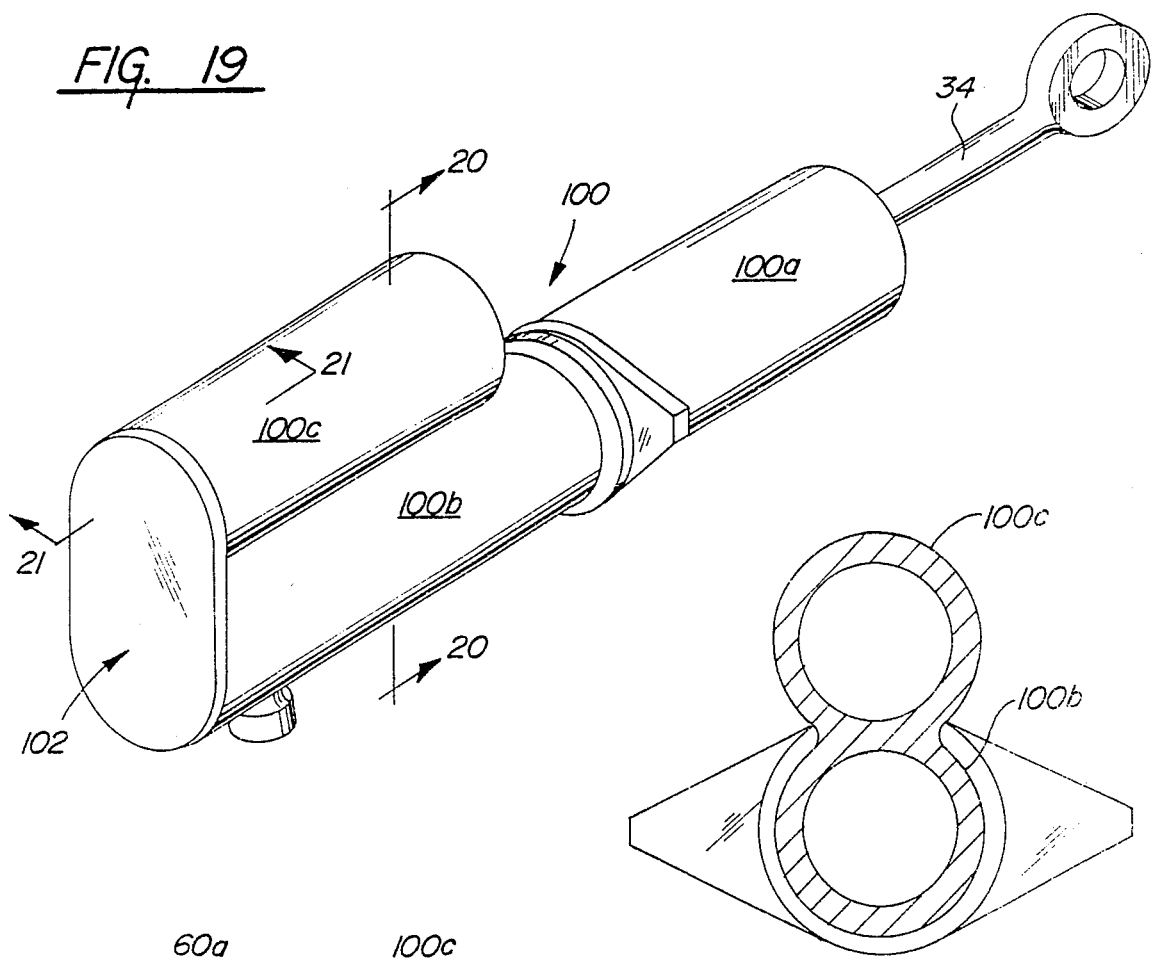
FIG. 19
FIG. 20
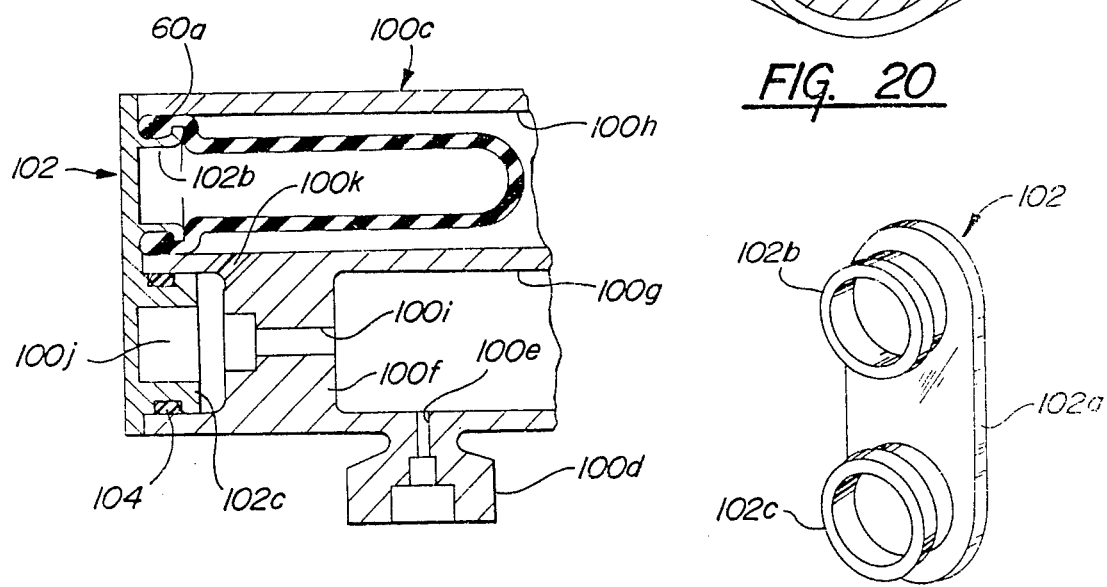
FIG. 21
FIG. 22

HYDRAULIC CYLINDER ASSEMBLY

This application is a division, of application Ser. No. 156,820, filed on 2/17/88, now U.S. Pat. No. 4,924,673 issued on May 19, 1990.

FIELD OF THE INVENTION

This invention relates to hydraulic cylinder assemblies and, more particularly, to hydraulic cylinder assemblies especially suitable for use in association with motor vehicle control systems such, for example, as clutch control systems.

BACKGROUND OF THE INVENTION

Hydraulic actuator apparatus are known for operating a mechanism at a remote location by way of a master cylinder connected to a slave cylinder installed at the remote location. A conduit interconnects the master cylinder to the slave cylinder and the hydraulic apparatus is filled with hydraulic fluid such that when the piston of the master cylinder is actuated, the piston of the slave cylinder, and consequently the piston rod or output member, are simultaneously actuated by displacement of hydraulic fluid from the master cylinder to the slave cylinder through the conduit.

More particularly, it is known to provide such hydraulic apparatus for operating the release mechanism of a friction clutch of a motor vehicle. As disclosed in Letters U.S. Pat. Nos. 4,407,125, 4,503,678 and 4,506,507, all assigned to the assignee of the present invention, it is further known to preassemble friction clutch hydraulic release apparatus by filling the master cylinder, the slave cylinder, the conduit interconnecting the cylinders, and a reservoir connected to the master cylinder with hydraulic fluid before shipment of the assembly to a motor vehicle manufacturer for installation in a motor vehicle.

Whereas such prefilled and preassembled hydraulic apparatus contribute importantly to the efficient and inexpensive assembly of the motor vehicle, the master cylinders of these apparatuses are serviceable by the operator of the motor vehicle and such servicing often causes problems with respect to the functioning of the total system or with respect to leakage of hydraulic fluid from the system.

SUMMARY OF THE INVENTION

The invention is directed to the provision of a master cylinder assembly for use with a prefilled hydraulic apparatus wherein the master cylinder comprises a sealed, non-serviceable unit intended for disposal in the event of malfunction.

This invention is further directed to the provision of a master cylinder assembly which is nonserviceable and which may therefore be positioned in the passenger compartment of the associated motor vehicle without concern for leakage into the passenger compartment upon attempted servicing of the unit.

The invention is further directed to the provision of a control assembly for a motor vehicle employing a nonserviceable master cylinder assembly.

The hydraulic master cylinder assembly of the invention includes a cylinder having a central axial bore and including a forward end, a rearward end, a discharge port adjacent the forward end, and a reservoir port adjacent the forward end; a piston mounted for sliding reciprocal axial movement in the cylinder bore; and an elongated reservoir having a central axial bore and including a rearward end and a discharge port adjacent its forward end. The reservoir is positioned in piggyback fashion on the cylinder with the bores extending generally parallel to each other and with the reservoir discharge port connected to the cylinder reservoir port to provide fluid communication between the reservoir bore and the cylinder bore. This arrangement provides a simple and compact package which may be readily formed as a sealed non-serviceable unit.

According to a further feature of the invention, means are provided for mounting the reservoir in piggyback fashion on the cylinder. The mounting The invention includes control assembly includes a bracket; a hydraulic cylinder assembly including a cylinder mounted on the bracket and a piston rod projecting out of the cylinder; a pedal assembly including a pedal arm mounted for pivotal movement on the bracket about a pivot axis and pivotally connected to the free end of the piston rod at a location spaced from the pivot axis; and means for mounting the bracket for adjustable pivotal movement about the pivot axis. This arrangement provides a convenient means of mounting a master cylinder assembly in readily adjustable fashion within the passenger compartment of the motor vehicle.

BRIEF DESCRIPTION OF THE DRAWINGS

FIG. 5 is a fragmentary perspective view of a pivotal mounting structure employed in the master cylinder assembly of FIG. 1;

FIG. 6 is a fragmentary perspective view of an alternate form of a pivotal mounting structure;

FIG. 10 is a cross-sectional view taken on line 10—10 of FIG. 7;

FIGS. 11-14 disclose an alternate form of the invention master cylinder assembly;

FIGS. 19-22 illustrate a further alternate form of the invention master cylinder assembly, FIG. 21 being taken on line 21—21 of FIG. 19.

DETAILED DESCRIPTION OF THE PREFERRED EMBODIMENT

Figure 1:
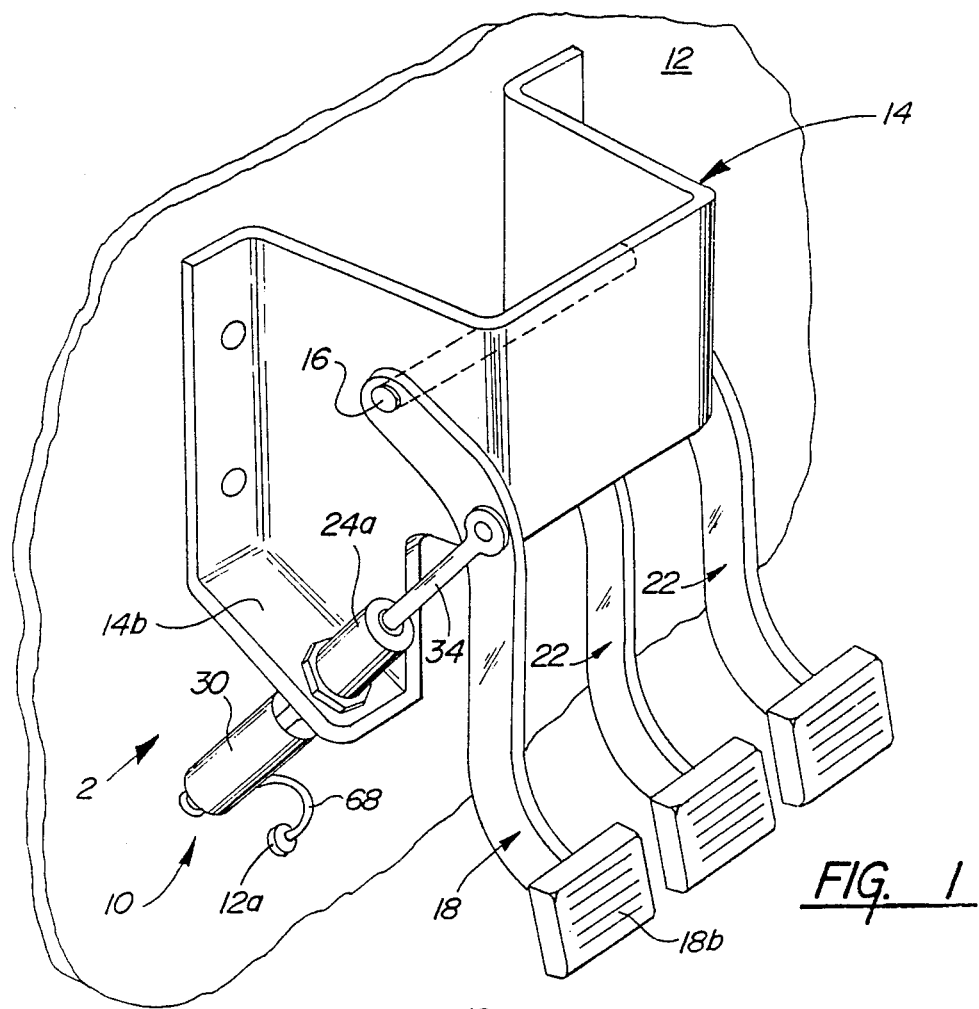
FIG. 1 is a fragmentary perspective view of a master cylinder assembly according to the invention shown in association with a motor vehicle control assembly.
Figure 2:
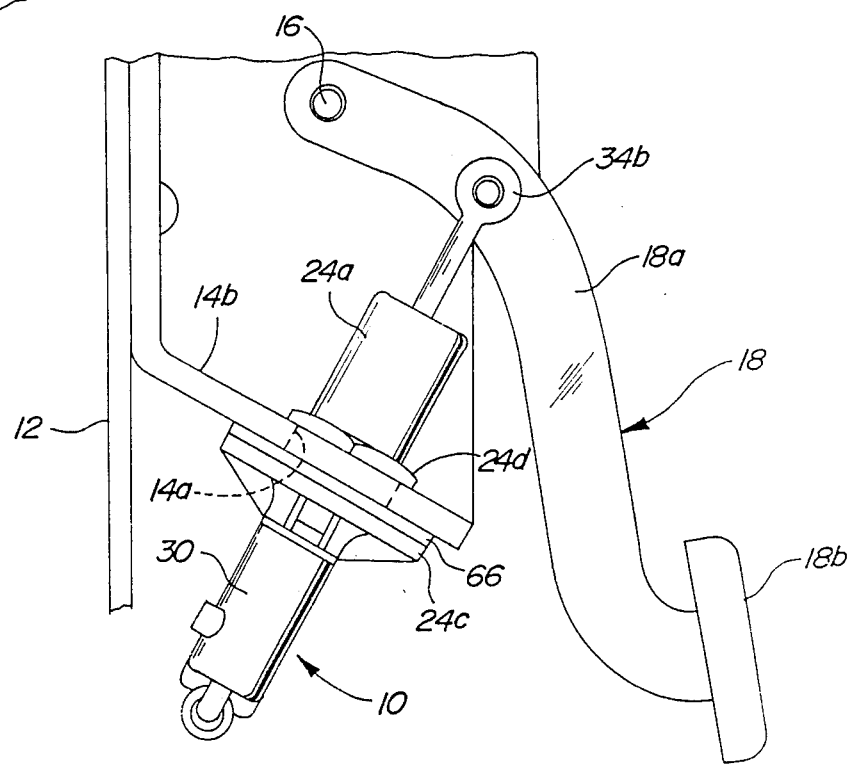
FIG. 2 is a view looking in a direction of the arrow 2 of FIG. 1.
Figure 3:
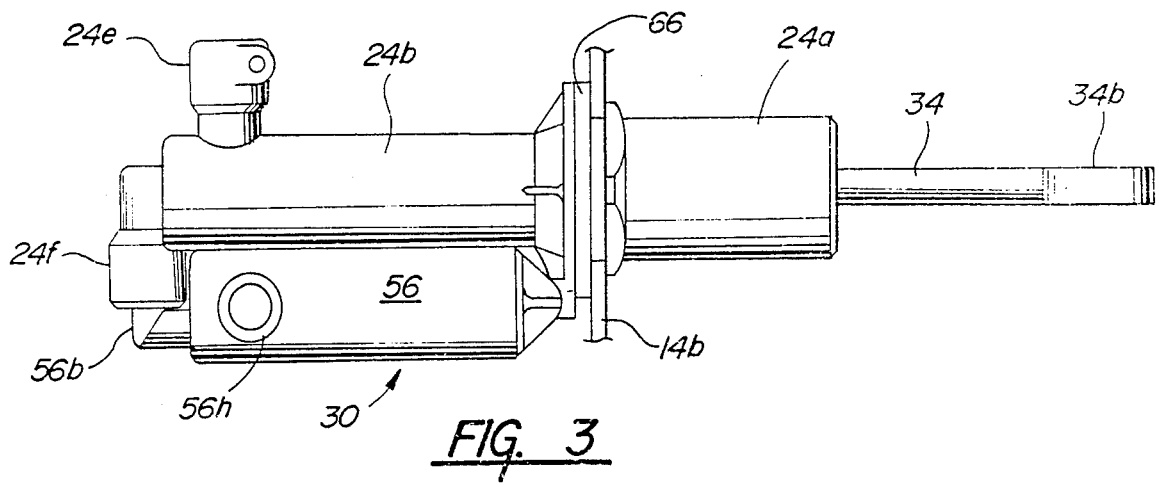
FIG. 3 is a plan view of the master cylinder assembly of FIG. 1.
Figure 4:
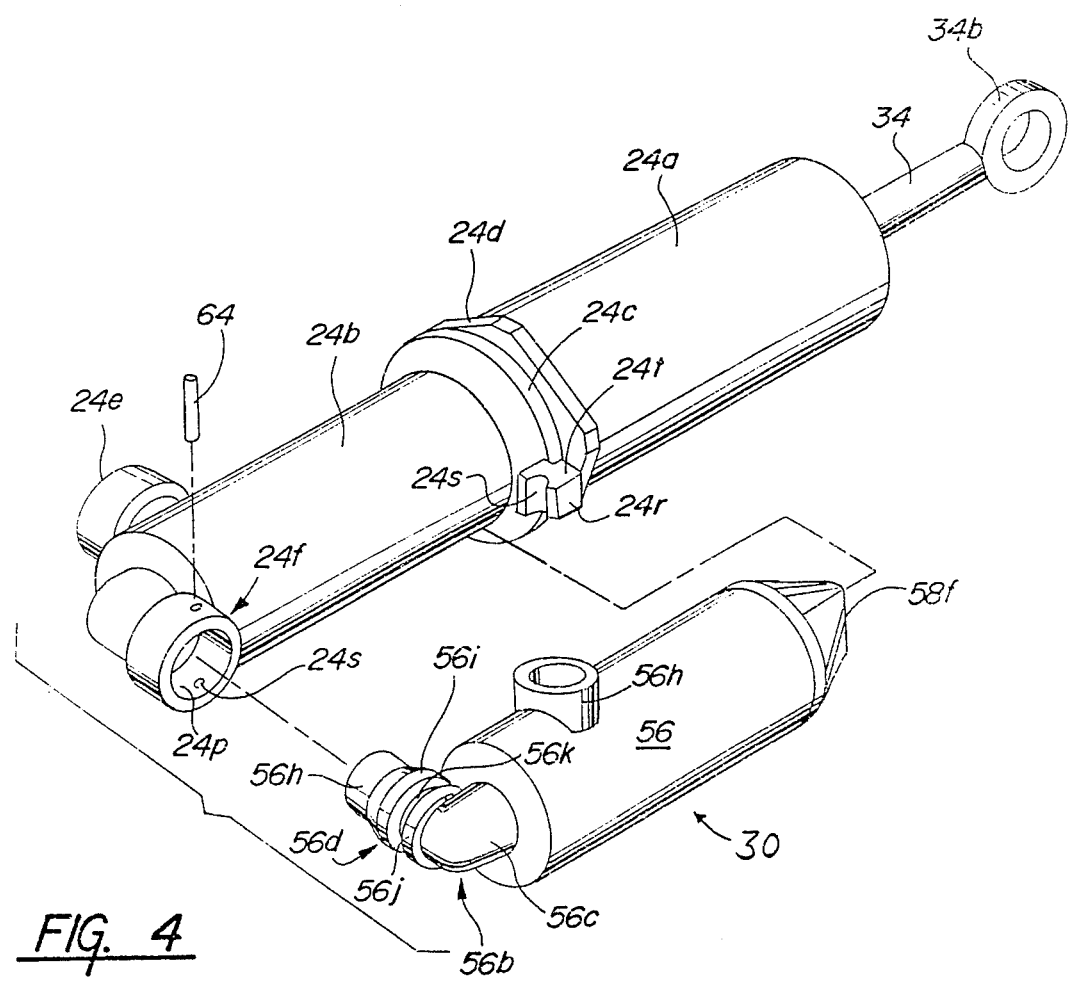
FIG. 4 is a perspective exploded view of the master cylinder assembly of FIG. 1.
Figure 7:
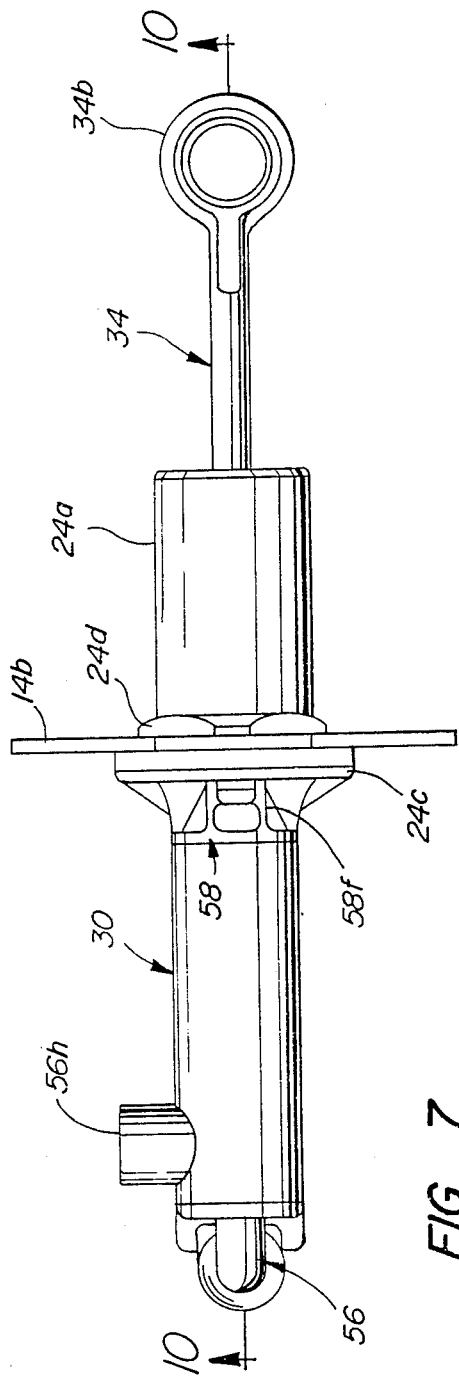
FIG. 7 is a side elevational view of the master cylinder assembly of FIG. 1.
Figure 9:
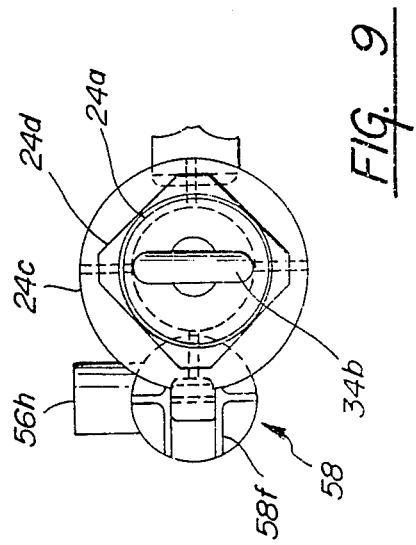
FIGS. 8 and 9 are end views looking respectively from the left and right of FIG. 7.

The master cylinder assembly 10 of the invention is seen in FIG. 1 in association with a motor vehicle of the type including a fire wall 12, a pedal box or bracket structure 14, a pivot shaft 16 carried by the bracket structure, a clutch pedal assembly 18 secured at its upper end to shaft 16, a brake pedal assembly 20 secured at its upper end to shaft 16, and an accelerator pedal assembly 22 secured at its upper end to shaft 16.

Master cylinder assembly 10, broadly considered, includes a cylinder 24, a piston assembly 26, a valving assembly 28, and a reservoir 30.

Cylinder 24 is preferably formed of a suitable plastic material in a molding operation and includes a relatively large diameter rearward end portion 24a, a relatively small diameter forward end portion 24b, a mounting flange 24c, a flange lock 24d, a discharge fitting 24e, and a reservoir fitting 24f.

Cylinder 24 defines a central axial bore 24g, an open rearward end 24h, and a forward end 24i closed by an end wall 24j.

Central bore 24g includes a relatively large diameter rearward portion 24k defined by relatively large diameter cylinder portion 24a and a relatively small diameter bore portion 24l defined by relatively small diameter cylinder portion 24b. An annular rearwardly facing shoulder surface 24m is defined at the juncture of bore portions 24k and 24l. Discharge fitting 24e projects integrally and laterally from the main body portion of cylinder 24 adjacent the closed end 24i of the cylinder and defines a discharge port 24n communicating with the interior of cylinder bore 24l. Reservoir fitting 24f is molded integrally with end wall 24j and defines a reservoir port or passage 24p including a central port 24q formed in end wall 24j.

External mounting flange 24c is formed adjacent the juncture of large diameter cylinder portion 24a and small diameter cylinder portion 24b and extends in annular fashion totally around the cylinder. Mounting flange 24c further defines a journal member 24r molded integrally with the mounting flange at a location radially outwardly from the exterior surface of the cylinder and defining a forwardly facing concave arcuate journal surface 24s. Locking flange 24d has a generally rectangular, oblong configuration and is spaced rearwardly from mounting flange 24c.

Piston assembly 26 includes a piston 32 and a piston rod 34. Piston 32 is formed of a plastic material in a molding operation and includes a relatively small diameter forward flange portion 32a slidably received in cylinder forward bore 24l; a central spool portion 32b of reduced diameter, and a relatively large diameter rear end portion 32c slidably received in cylinder rearward bore 24k. Rearward portion 32c forms an annular forwardly facing shoulder surface 32d which coacts with bore shoulder 24m to define the extreme forward position of the piston within bore 24g. A retainer 36 is received in a hollow rearwardly opening bore 32e of piston 32 and includes an annular portion 36a engaging the rear annular end face of the piston and coacting with a snap ring 38 received in an annular groove defined by a retainer member 40 to define the extreme rearward position of the piston within the bore of the cylinder.

Piston rod 34 includes a forward spherical end 34a and a rearward end 34b in the form of an eye. Spherical forward end 34a mounts pivotally within retainer member 36 and is precluded from rearward movement relative to the retainer member by retainer spring finger portions 36b engaging an annular shoulder 34c formed at the rear end of spherical end 34a.

Valving assembly 28 includes a valve stem 42, a valve assembly 44, and a retainer member 46.

Retainer member 46 is secured to a front, nose portion 32f of piston 32 as by sonic welding and coacts with nose portion 32f and flange portion 32a to define a seal groove for receipt of an elastomeric seal 48.

Valve assembly 44 includes a retainer member 50 seated against end wall 24j and an annular elastomeric member 52 carried on the forward end of valve stem 42 and sealingly coacting with reservoir port 24q to selectively open and close that port. Valve stem 42 extends rearwardly in bore 24l from valve assembly 44 and includes a head portion 42a at its rearward end snappingly engaged by finger portions 46a of retainer 46.

Piston 32 includes a central forwardly opening bore 32g sized to slidably receive valve stem end portion 42a. A return coil spring 54 is positioned in bore 24l and extends from seating engagement at its forward end with retainer 50 to seating engagement at its rearward end with retainer 46. It will be understood that with the piston in its fully retracted position as illustrated in FIG. 10, fingers 46a of retainer 46 engage head portion 42a of valve stem 42 to maintain annular elastomeric member 52 in axially spaced disposition with respect to reservoir port 24q so as to establish communication between cylinder bore 24l and the reservoir port and that, as the piston is advanced forwardly in the cylinder in response to appropriate stroking input from piston rod 34, valve stem head portion 42a moves telescopically into piston bore 32g and elastomeric member 52 is moved into sealing engagement with reservoir port 24q by an internal coil spring 53 in valve retainer 50 so as to cut off communication between cylinder bore 24l and reservoir 30.

Reservoir 30 is formed in a molding operation of a suitable plastic material and includes a main body sleeve portion 56 defining a central axial bore 56a, a discharge fitting 56b provided at the front of the reservoir and formed integrally with sleeve 56, and a rear end cap 58. Sleeve 56 has a diameter approximating the diameter of cylinder reduced diameter portion 24b and has a length dimensioned to fit comfortably between cylinder reservoir fitting 24f and cylinder mounting flange 24c.

Discharge fitting 56b includes an axially extending portion 56c extending forwardly from the forward end of the reservoir and a radially extending portion 56d. Axially extending portion 56c defines a passage 56e communicating with a radial passage 56f defined by radially extending fitting portion 56d. Passage 56f terminates in a discharge port 56g. Radially extending fitting portion 56d includes a nose portion 56h, an external flange 56i, and a further external flange 56j forming an annular groove 56k in coaction with flange 56i.

End cap 58 fits telescopically within the rear end of sleeve 56 and includes an annular skirt portion 58a defining an annular bead 58b for trapping receipt of the lip portion 60a of an elastomeric diaphragm 60 positioned within reservoir bore 56a. End cap 58 further defines a journal member 58c including a convex rearwardly facing arcuate journal surface 58d sized to fit snugly within concave journal surface 24s defined by journal means 24r. Journal member 58c is supported by a central rib 58e and by spaced triangular flanges 58f which extend rearwardly beyond arcuate journal surface 58d.

To assemble the invention master cylinder assembly, assuming that piston assembly 26 and valving assembly 28 have previously been installed within the cylinder 24, convex journal surface 58d on reservoir 30 is positioned in concave journal surface 24s on cylinder 24 and the reservoir is thereafter pivoted about the axis defined by journal surfaces 58d and 24s to bring reservoir discharge fitting 56d into telescopic relation with cylinder fitting 24f. Flanges 54f coact with the upper and lower surfaces 24t and 24u of journal 24r to preclude vertical displacement of journal 58c relative to journal 24r. As reservoir fitting 56d moves telescopically into cylinder fitting 24f, an O-ring 62 positioned on nose portion 56h of fitting 56d moves into seating and sealing engagement with a shoulder 24w defined within fitting 24f to sealingly position fitting 56d within fitting 24f, whereafter a pin 64 is passed through openings 24s in fitting 24f and into tangential position with respect to groove 56k. Pin 24 precludes axial withdrawal of fitting 56d from fitting 24f and allows the reservoir 30 to pivot about the axis of fitting 56d. Reservoir 30 is thus mounted in permanently sealed, piggyback fashion with respect to cylinder 24.

In the alternate form of journal structure seen in FIG. 6, the journal provided on flange 24c comprises a pin 24v carried by radially outwardly extending and circumferentially spaced finger portions 24w and the journal provided on reservoir 30 comprises a hook member 58g extending rearwardly from end cap 58 and sized to engage under and around pin 24v to provide a pivotal connection for the reservoir to the cylinder.

In the utilization of the invention master cylinder assembly in the vehicle control assembly seen in FIG. 1, an annular resilient member 66 is positioned on the rearward face of mounting flange 24c; piston rod 34 and rearward cylinder portion 24a are passed rearwardly and upwardly through a rectangular opening 14a in a downwardly and rearwardly angled plate portion 14b of bracket structure 14 to bring resilient member 66 into sealing and seating engagement with the under, forward face of plate portion 14b to position reservoir 30 and cylinder forward portion 24b forwardly and below bracket plate portion 14b; the master cylinder assembly is thereafter turned through approximately 45 degrees to allow locking flange 24d to lockingly engage the upper face of plate portion 14b; a high pressure conduit 68 is inserted into discharge port 24n and passed through an opening 12a in fire wall 12 for attachment in known manner to a slave cylinder (not shown) situated in the engine compartment of the vehicle adjacent the clutch of the vehicle; and eye 34b of piston rod 34 is suitably secured to the pedal arm 18a of clutch pedal assembly 18 between shaft 16 and clutch pedal 18b so that pivotal movement of the clutch pedal assembly about the axis of shaft 16 serves to reciprocate piston 26 within the bore of the cylinder and selectively deliver pressurized fluid through conduit 68 to disengage and engage the clutch upon operator command.

In the alternate form of the invention seen in FIGS. 11-14, the master cylinder assembly 10, rather than being mounted on an angled plate portion, such as the portion 14b, of the pedal bracket structure is mounted on a separate bracket which is adjustably secured to the primary pedal bracket structure. Specifically, the master cylinder assembly is mounted on a bracket 70 which in turn is secured to the pedal box or pedal bracket 14.

Bracket 70 has a generally U configuration and includes an arm portion 70a, a further arm portion 70b, and a bight portion 70c. Master cylinder assembly 10a is mounted through an aperture 70d in bight portion 70c with cylinder rearward end portion 24a projecting rearwardly and upwardly from bight portion 70c and cylinder forward end portion 24b projecting downwardly and rearwardly from bight portion 70c. A sleeve 72 extends between the upper end of arm portion 70a and the confronting portion of arm portion 70b and includes a portion 72a extending beyond arm portion 70b. Sleeve 72 passes through aligned apertures in bracket portions 70a and 70b and is held in position relative to bracket 70 by a snap ring 73 and a collar portion 72b of the sleeve. Sleeve 72 defines a central bore 72c. Pedal arm assembly 18 includes a pedal arm 18a, a pedal 18b, a journal sleeve 74, and a pivot pin 76. Journal sleeve 74 is welded to the upper end of pedal arm 18a and is journalled on sleeve 72 between bracket arm portion 70a and 70b to provide the required pivotal movement of the pedal arm. Pivot pin 76 is welded to pedal arm 18a intermediate the ends of arm 18a and pivotally receives the eye 34b of piston rod 34. Alternatively, as seen in FIG. 14, pedal arm assembly 18, including arm 18a, pedal 18b, sleeve 74, and pin 76, may comprise a unitary molded part formed of a glass or carbon fiber reinforced plastic material.

Arm portion 70b extends upwardly above bushing 72 in the form of an inwardly angled portion 70e which includes a slot 70f at its upper end. Slot 70f is elongated in a direction tangent to a circle is centered on the pivot axis defined by sleeve 72. In this form of the invention, pivot shaft 16 includes a portion 16a projecting laterally from pedal box 14, and an aperture 14a is provided in pedal box 14 generally above pivot shaft extension 16a. To mount the bracket 70 with the master cylinder assembly mounted thereon on the pedal bracket 14, sleeve 72 is passed over pivot shaft extension 16a and a suitable fastener 78 is passed through bracket aperture 14a and through slot 70f to secure the bracket 70 to the pedal bracket 14. The position of the bracket 70 relative to the pedal bracket 14, and thereby the position of clutch pedal assembly 18, may be selectively varied by loosening the fastener 78 and rotating the bracket 70 about the axis of shaft extension 16a with the pivotal movement of the bracket being accommodated by movement of fastener 74 in arcuate slot 70f. When the desired position of annular adjustment of the bracket relative to the pedal bracket has been achieved, fastener 78 is again tightened to lock the bracket 70, and thereby the master cylinder assembly, in the desired position of angular adjustment to provide clutch disengagement in response to a precise and consistent amount of pedal stroke irrespective of manufacturing tolerances in each vehicle in which the master cylinder assembly is installed.

The master cylinder assembly 10 of the FIGS. 11-14 embodiment further includes an electrical limit switch 80 secured to a tab 70g struck from arm portion 70a of bracket 70 and including a contact plunger 82 positioned in the path of pivotal movement of pedal arm 18a as the arm pivots about its pivot axis. Switch 80 includes adjustment means so that the position of plunger 82 relative to arm 18a in the fully retracted position of the master cylinder assembly may be adjusted and preset to provide actuation of the clutch interlock circuit of the associated vehicle at such time as the clutch is fully disengaged.

The quick connect coupling shown in FIGS. 15-18 is utilized to facilitate mounting of the conduit 68 in the vehicle bulkhead 12.

The quick connect coupling, generally designated by the reference numeral 84, includes a main body member 86 of generally cylindrical construction, a plug member 88 positioned in one end of main body member 86, a fitting 90 including an enlarged diameter tubular portion 90a positioned in the other end of main body member 86 and a reduced diameter tubular portion 90b receiving the free end of conduit 68, a coil spring 92 positioned within member 86 and biasing plug 88 into a position sealing the adjacent end of member 86, and a collar 94 suitably secured to member 86 in surrounding relation to reduced diameter fitting portion 90b. Collar 94 includes a main body tubular portion 94a, an annular flange portion 94b at one end of tubular portion 94a, and a pair of diametrically opposed ear portions 94c at the other end of tubular portion 94a. In use, the free end of conduit 68 is fitted over reduced diameter portion 90b of fitting 90 and the coupling is passed through an aperture in the bulkhead 12 having a diameter less than the diameter of flange portion 94b of collar 94 and less than the relaxed diametrical extent of ears 94c. As the coupling is passed through the aperture in the bulkhead, ears 94c flex radially inwardly in cantilever fashion to allow the ears to pass through the aperture, whereafter the ears snap radially outwardly to trap the bulkhead 12 between ears 94c and flange 94b and securely position the coupling in the bulkhead 12, whereafter a female coupling, not shown, may be fitted over coupling 84 in known manner to move plug 88 away from the open end of member 86 and provide fluid communication through coupling 84.

It will be understood that master cylinder assembly 10 would normally be delivered to the motor vehicle manufacturer as part of a prefilled and pretested package including the master cylinder assembly, conduit 68, and an associated slave cylinder with the filling of the total package being accomplished by appropriate bleeding at the slave cylinder and then filling of the package through the reservoir port 56h formed integrally with reservoir sleeve 56. Depending on the installation, the prefilled and pretested package may also include one or more quick disconnect fittings to enable the components of the package to be separated during assembly and then reconnected without loss of their prefilled condition.

Figure 8:
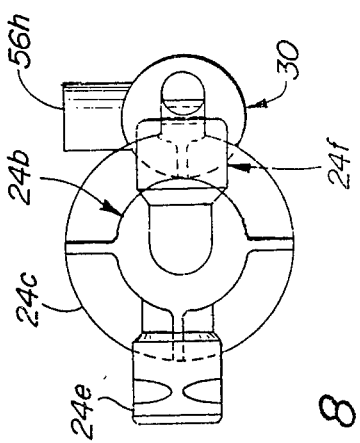
Figure 12:
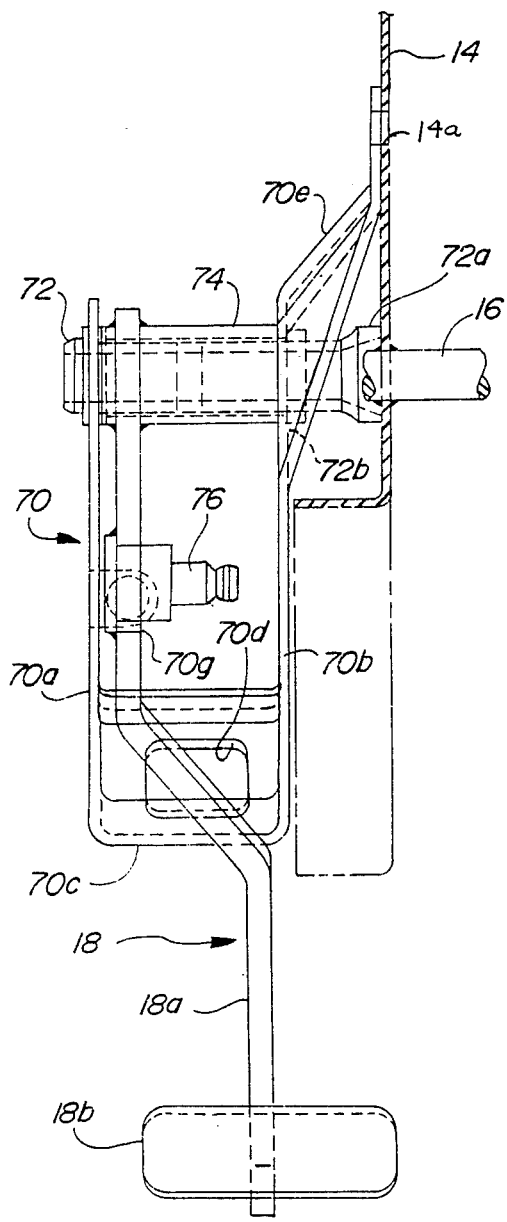
Figure 15:
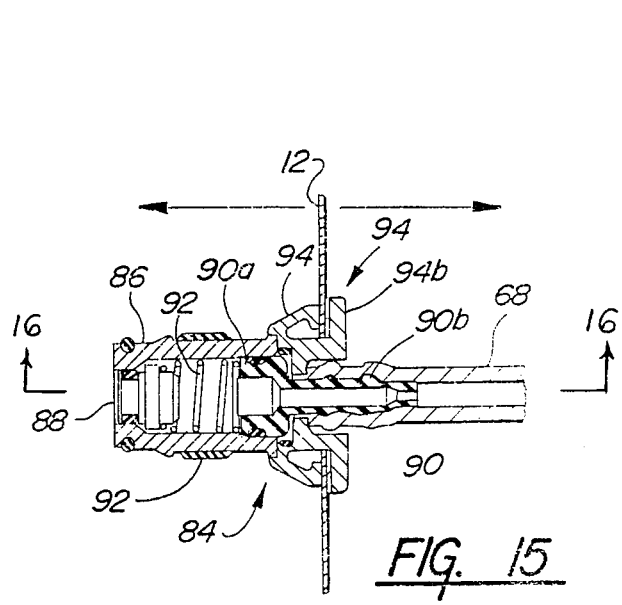
FIG. 15 is a cross-sectional view of a quick connect coupling for use with the invention master cylinder assembly.
Figure 16:
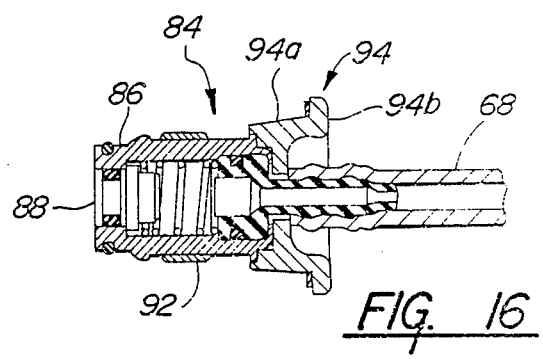
FIG. 16 is a cross-sectional view taken on line 16—16 of FIG. 15.
Figure 17:
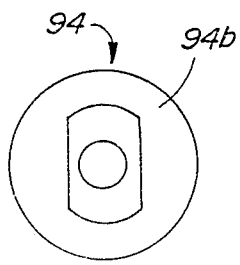
FIGS. 17 and 18 are end views of the quick connect coupler of FIGS. 15 and 16.
Figure 18:
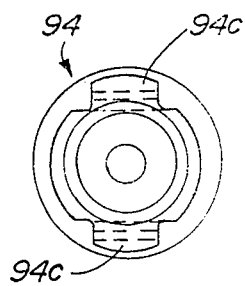

A further form of master cylinder assembly according to the invention is seen in FIGS. 19-22. The embodiment of FIGS. 19-22 is generally similar to the embodiment of FIGS. 1-10 with the exception that the reservoir and cylinder are formed as a unitary molded member rather than being formed as separate members with the reservoir separably mounted on the cylinder. Specifically, the cylinder 100, in addition to a relatively large diameter rearward portion 100a and a relatively small diameter forward portion 100b, further includes a reservoir portion 100c molded integrally with forward portion 100b so as to form, as best seen in FIG. 19, a generally FIG. 8 configuration with one portion of the FIG. 8 constituting the relatively small diameter forward portion of the cylinder and the other portion of the FIG. 8 defining the reservoir. The forward cylinder portion 100b and reservoir portion 100c are molded with open forward ends. Cylinder portion 100b includes a discharge fitting 100d defining a discharge port 100e, and a partition 100f is provided adjacent but spaced rearwardly from the open forward end of cylinder portion 100b. The open forward ends of cylinder portion 100b and reservoir portion 100c are closed by an end cap 102, seen as a separate element in FIG. 21 and seen in its assembled relation to the cylinder in FIGS. 18 and 20. End cap 102 includes a main body portion 102a, an annular reservoir closure portion 102b, and an annular cylinder closure portion 102c. In the assembled relation of the end cap and the cylinder, annular reservoir closure portion 102b is fitted into the open forward end of reservoir portion 100c and traps the annular lip 60a of the elastomeric diaphragm 60 positioned within the reservoir, and annular cylinder closure portion 102c is fitted into the open forward end of cylinder portion 100b and coacts with an O-ring 104 to preclude leakage of fluid out of the open end of cylinder portion 100b. With end cap 102 in place, fluid communication is established between the internal bore 100g of cylinder portion 100b and the internal bore 100h of reservoir portion 100c by a central reservoir port 100i provided in partition 100f, a chamber 100j defined rearwardly of end cap 102 and forwardly of partition 100f, and an angled reservoir discharge port 100k extending between chamber 100j and reservoir bore 100h. It will be understood that a piston and valve assembly of the general type disclosed in the FIGS. 1-10 embodiment is also included in the FIGS. 18-21 embodiment so that communication is blocked between cylinder portion 100b and reservoir portion 100c in response to forward, stroking movement of piston rod 34 and communication between reservoir portion 100c and cylinder portion 100b is reestablished upon rearward, retracting movement of piston rod 34.

The invention master cylinder assembly will be seen to provide many important advantages. The piggyback mounting of the reservoir on the cylinder provides an extremely compact package and thereby facilitates installation in the extremely cramped environments of modern day motor vehicles. The pivotal mounting of the reservoir on the cylinder allows the cylinder and reservoir to be readily and inexpensively assembled so as to provide a relatively inexpensive final product. The simple manner in which the reservoir and cylinder pivotally and sealingly coact enables the master cylinder assembly to be delivered as a permanently sealed unit to the motor vehicle manufacturer and thereby allows the unit to be installed in the passenger compartment of the motor vehicle without fear of contamination of the passenger compartment during the course of attempts to service the master cylinder assembly. The compact nature of the master cylinder assembly also allows it to be installed in the relatively crowded and confined environment of the passenger compartment. The two-step bore of the master cylinder allows the external mounting flange of the master cylinder to be provided at the juncture of the small diameter and large diameter bores so that any sink marks created on the internal periphery of the cylinder as a result of the draw created by the mounting flange in the molding process will not interfere with the smooth reciprocal sliding movement of the piston within the cylinder. And the multi-step bore also provides a convenient and positive means of defining the extreme forward position of the piston within the cylinder by allowing the annular shoulder on the piston to seat against the annular shoulder defined at the juncture between the large diameter bore portion and the small bore diameter bore portion. The multi-step bore also simplifies the plastic molding operation of the cylinder by minimizing the length of bore along which the bore dimensions must be carefully controlled during the molding process.

Whereas preferred embodiments of the invention have been illustrated and described in detail, it will be apparent that various changes may be made in the disclosed embodiments without departing from the scope or spirit of the invention.

We claim:

1. A vehicle control assembly comprising:
   (A) a bracket;

(B) a hydraulic cylinder assembly including a cylinder mounted on said bracket and a piston rod projecting out of said cylinder;

(C) a pedal assembly including a pedal arm pivotally connected to the free end of said piston rod; and (D) pivot mounting means on said bracket including means for mounting said bracket for pivotal movement about a pivot axis and means mounting said pedal arm at a location thereon spaced from its pivotal connection to the free end of said piston rod for pivotal movement on said bracket about an axis coincident with said bracket pivot axis.

2. A vehicle control assembly according to claim 1 wherein:

(E) said pivot mounting means includes a sleeve mounted on said bracket;

(F) said pedal arm is journaled on the exterior periphery of said sleeve; and (G) said bracket is mounted for pivotal movement on a pivot shaft received in said sleeve.

3. A vehicle control assembly according to claim 1 wherein:

(E) said assembly further includes a limit switch mounted on said bracket and including a movable switching element mounted in the path of pivotal movement of said pedal arm so as to be engaged by said pedal arm in response to pivotal movement of the pedal arm about said pivot axis.

4. A vehicle control assembly according to claim 3 wherein:

(F) said limit switch is adjustable relative to said bracket so as to allow said limit switch to be preset during the assembly of said control assembly.

5. A control assembly according to claim 1 wherein:
said pedal assembly further includes a pedal pad on the lower end of said pedal arm, a sleeve on the upper end of said pedal arm mounting said pedal arm on said pivot mounting means for pivotal movement on said bracket about said pedal arm pivot axis, and a pin on said pedal arm between said sleeve and said pedal pad pivotally receiving the free end of said piston rod.

6. A control assembly according to claim 5 wherein:
said pedal assembly is formed as a unitary molded part formed of a plastic material.

7. A control assembly according to claim 6 wherein:
said plastic material is a fiber reinforced plastic material.

8. A vehicle control assembly comprising:
a bracket having a U configuration with a pair of generally parallel side arm portions and a bight portion interconnecting the lower ends of said arm portions;

a hydraulic cylinder assembly including a cylinder mounted on said bracket bight portion and a piston rod projecting out of said cylinder;

a sleeve mounted on said bracket and extending between said bracket arm portions proximate the upper ends thereof;

a pivot shaft received in said sleeve to mount said bracket for pivotal movement about the axis of said pivot shaft; and a pedal assembly including a pedal arm journalled at its upper end on said sleeve, carrying a pedal pad at its lower end, and being pivotally connected intermediate its ends to the free end of said piston rod.

9. A control assembly according to claim 8 wherein:
one of said bracket side arm portions extends upwardly above said sleeve; and
said bracket mounting means further includes a slot in the upper end of said one bracket side arm portion for receipt of a fastener member.

10. A control assembly according to claim 9 wherein:
said slot is elongated in a direction generally tangent to a circle centered on said pivot axis.

* * * * *

UNITED STATES PATENT AND TRADEMARK OFFICE
CERTIFICATE OF CORRECTION

PATENT NO. : 4,949,590  Page 1 of 2

DATED : August 21, 1990

INVENTOR(S) : David C. Barker & Keith V. Leigh-Monstevens

It is certified that error appears in the above-identified patent and that said Letters Patent is hereby corrected as shown below:

Column 1, Lines 63, 64, 65, 66, 67, and 68, Please delete "The hydraulic master cylinder assembly of the invention includes a cylinder having a central axial bore and including a forward end, a rearward end, a discharge port adjacent the forward end, a rearward end, a discharge port adjacent the forward end, and a reservoir port adjacent the forward end; a piston mounted for sliding reciprocal axial movement in the cylinder bore; and an"

Column 2, Lines 1, 2, 3, 4, 5, 6, 7, 8, 9, 10, 11, 12, and 13, Please delete "elongated reservoir having a central axial bore and including arearward end and a discharge port adjacent its forward end. The reservoir is positioned in paggyback fashion on the cylinder with the bores extending generally parallel to each other and with the reservoir discharge port connected to the cylinder reservoir port to provide fluid communication between the reservoir bore and the cylinder bore. This arrangement provides a simple and compact package which may be readily formed as a sealed non-serviceable unit.
  According to a further feature of the invention, means are provided for mounting the reservoir in piggy back fashion

UNITED STATES PATENT AND TRADEMARK OFFICE
CERTIFICATE OF CORRECTION

PATENT NO. : 4,949,590

DATED : August 21, 1990

INVENTOR(S) : David C. Barker, et. al.

It is certified that error appears in the above-identified patent and that said Letters Patent is hereby corrected as shown below:

on the cylinder. The mounting"

Signed and Sealed this

First Day of September, 1992

Attest:

DOUGLAS B. COMER

Attesting Officer

Acting Commissioner of Patents and Trademarks